United States Patent
Recouly et al.

(10) Patent No.: US 10,289,878 B2
(45) Date of Patent: May 14, 2019

(54) SYSTEM FOR RFID TRANSPONDER INTERROGATION BY FREQUENCY TRANSPOSITION

(71) Applicant: TAGSYS, La Ciotat (FR)

(72) Inventors: Marc Recouly, La Ciotat (FR); Cyril Catalanotto, Toulon (FR); Michel Talon, Miramas (FR); Christophe Loussert, Aix-en-Provence (FR)

(73) Assignee: TAGSYS, La Ciotat (FR)

( * ) Notice: Subject to any disclaimer, the term of this patent is extended or adjusted under 35 U.S.C. 154(b) by 0 days.

(21) Appl. No.: 15/500,588

(22) PCT Filed: Jul. 30, 2015

(86) PCT No.: PCT/EP2015/067599
§ 371 (c)(1),
(2) Date: Jun. 27, 2017

(87) PCT Pub. No.: WO2016/016405
PCT Pub. Date: Feb. 4, 2016

(65) Prior Publication Data
US 2018/0082089 A1    Mar. 22, 2018

Related U.S. Application Data

(60) Provisional application No. 62/032,056, filed on Aug. 1, 2014.

(30) Foreign Application Priority Data
Sep. 15, 2014 (FR) ..................... 14 58680

(51) Int. Cl.
G06K 7/10        (2006.01)
H04B 5/00        (2006.01)
H04B 5/02        (2006.01)

(52) U.S. Cl.
CPC ..... *G06K 7/10178* (2013.01); *G06K 7/10069* (2013.01); *G06K 7/10217* (2013.01);
(Continued)

(58) Field of Classification Search
CPC .......... G06K 7/10366; G06K 7/10316; G06K 7/10178; G06K 7/10217; G06K 7/10069; G06K 7/1035; H04B 5/02; H04B 5/0062
See application file for complete search history.

(56) References Cited

U.S. PATENT DOCUMENTS 7,221,259 B2    5/2007   Cole
7,606,530 B1   10/2009   Anderson et al.
(Continued)

FOREIGN PATENT DOCUMENTS

EP    1440424 B1    4/2012
EP    2332093 B1    4/2012
(Continued)

OTHER PUBLICATIONS

Sithamparanathan Sabesan, et al., Passive UHF RFID Interrogation System Using Wireless RFID Repeater Nodes, 2013 IEEE International Conference on RFID, pp. 136-143.
(Continued)

*Primary Examiner* — Sonji N Johnson
(74) *Attorney, Agent, or Firm* — Young & Thompson

(57) ABSTRACT

Disclosed is a system for electromagnetic interrogation of RFID transponders including at least one RFID terminal configured to emit an interrogation signal at a frequency F1, at least one RFID device referred to as repeater configured to receive the interrogation signal with frequency F1 and to repeat same towards at least one RFID transponder at the frequency F2, characterized in that the at least one RFID terminal includes at least one RFID reader configured to emit an interrogation signal with frequency F0 and at least
(Continued)

one add-on RFID device configured to perform a frequency transposition from the frequency F0 to the frequency F1, the frequencies F0 and F1 being different.

27 Claims, 6 Drawing Sheets

(52) U.S. Cl.
CPC ..... *G06K 7/10316* (2013.01); *G06K 7/10366* (2013.01); *H04B 5/0062* (2013.01); *H04B 5/02* (2013.01); *G06K 7/10356* (2013.01)

(56) References Cited

U.S. PATENT DOCUMENTS

| | | | |
|---|---|---|---|
| 7,812,725 | B2 | 10/2010 | Bolander et al. |
| 8,395,482 | B2 | 3/2013 | Sadr et al. |
| 8,547,207 | B2 | 10/2013 | Wang et al. |
| 8,629,762 | B2 | 1/2014 | Sadr et al. |
| 8,680,970 | B2 | 3/2014 | Sadr et al. |
| 2007/0080804 | A1 | 4/2007 | Hirahara et al. |
| 2010/0039228 | A1 | 2/2010 | Sadr et al. |
| 2010/0156610 | A1 | 6/2010 | Wild et al. |
| 2010/0253479 | A1 | 10/2010 | Cunningham et al. |
| 2011/0090059 | A1 | 4/2011 | Sadr |
| 2011/0205025 | A1 | 8/2011 | Roesner et al. |
| 2012/0139704 | A1 | 6/2012 | Sadr et al. |
| 2012/0217307 | A1 | 8/2012 | Martin et al. |

FOREIGN PATENT DOCUMENTS

| | | |
|---|---|---|
| JP | 1166250 A | 3/1999 |
| WO | 03038778 A1 | 5/2003 |
| WO | 2008079377 A1 | 7/2008 |
| WO | 2008118875 A1 | 10/2008 |
| WO | 2009151778 A2 | 12/2009 |
| WO | 2010027980 A1 | 3/2010 |
| WO | 2011159171 A2 | 12/2011 |
| WO | 2013160611 A1 | 10/2013 |
| WO | 2014013439 A1 | 1/2014 |
| WO | 2015092333 A1 | 6/2015 |

OTHER PUBLICATIONS

Karthik Narayanan Moncombu Ramakrishnan, Performance Benchmarks for Passive UHF RFID Tags, Master's Thesis, 2003, pp. ii-87.
Talon™ UWB Reader/Controller, Tagent Confidential, Jul. 24, 2009, pp. 1-3.

SYSTEM FOR RFID TRANSPONDER INTERROGATION BY FREQUENCY TRANSPOSITION

TECHNICAL FIELD OF THE INVENTION

The present invention relates to the field of radio frequency identification (RFID) in general, and specifically to communication systems between a reader/interrogator and RFID devices. The present invention can be used in many fields such as for product inventories in a warehouse or store, and specifically, for example, in the field of distribution

STATE OF THE ART

The scope of application of RFID technology has been growing for several years. Previously only known to the general public for its use in anti-theft technology, it is currently used in many industrial sectors for purposes of stock traceability and management, for example. A passive transponder is a transponder which does not have its own power source. Its power supply comes from an electromagnetic wave which it receives via an antenna and which is then converted into a current source so as to power the functions of the transponder. The communication protocols are regulated and standardised (EPC UHF Gen2 standard and ISO 18000-6 standard). Thus, the generally encountered RFID readers/interrogators operate with passive transponders configured to be powered and to communicate at a single frequency close to 900 MHz, specifically comprised between 865.6 MHz and 867.6 MHz in Europe and between 902 MHz and 928 MHz in the United States. However, there are RFID devices which do not operate according to these commonly used frequencies. Thus, for this type of devices, a specific reader/interrogator is necessary because the communication frequency is not a standard frequency.

Technological developments have made it possible to reduce the size of passive transponders so that they can be included in small elements, for example in textile elements in a simple seam, for example, or even affixed to documents. The increased use of this technology in sectors with high product density involves certain constraints. Indeed, extensive infrastructure is sometimes required in order to be able to communicate with each of the transponders located in a storage space. The placement of readers/interrogators so as to cover a whole site can then become expensive whenever the storage site is larger than 20 square meters. In order to reduce the installation and maintenance costs, a number of solutions have been proposed. The main idea of these solutions relies on the use of what is referred to as a power node.

Since passive transponders are standard most of the time, they operate at the frequencies indicated beforehand.

In order to avoid interference phenomena in the power node, a first solution consists of choosing a communication frequency between the reader/interrogator and the power node that is different from the standard communication frequencies for the transponders.

It is then necessary to design a reader/interrogator in which the communication frequency is calibrated to operate with the power nodes. This requires time for research and development, integrating the solution into a pre-existing RFID environment.

This solution is not satisfactory in terms of development cost, except for very extensive projects.

A second solution consists of keeping identical frequencies for communication between the reader/interrogator and the power node as well as for communication between the power node and the transponders, and of providing a system of directional antennas for isolating said two types of communications. Interference can thus be reduced by accurately configuring the geometry and the orientation of the antennas. The existing solutions based on antenna directivity do not, however, allow satisfactory isolation with an acceptable cost.

The present invention proposes a solution which makes it possible at least partially to solve the disadvantages mentioned above.

In particular, it proposes an effective solution for increasing the distance or the accuracy of communication between the RFID reader and transponders while maintaining limited or reduced costs.

SUMMARY OF THE INVENTION

According to a first aspect, the present invention relates to a system for electromagnetic interrogation of RFID transponders comprising at least one RFID terminal configured to emit an interrogation signal at a frequency F1, at least one RFID device referred to as repeater configured to receive the interrogation signal with frequency F1 and to repeat same towards at least one RFID transponder at the frequency F2, characterised in that the at least one RFID terminal includes at least one RFID reader configured to emit an interrogation signal with frequency F0 and at least one add-on RFID device, configured to perform a frequency transposition from the frequency F0 to the frequency F1, the frequencies F0 and F1 being different.

The use of a frequency F1 different from the frequency F0 emitted by the reader makes it possible to avoid the self-blindness phenomena inherent in devices comprising an input frequency identical to the amplified signal at the output. This makes it possible to avoid excessively high isolation between the receiving antenna and the emitting antenna of the device as well as to avoid the need to use low amplification gain.

In an advantageous and optional manner, the frequency transposition from the frequency F0 to the frequency F1 is carried out by mixing the analog interrogation signal or an analog signal which is a function of the interrogation signal with a reference signal from a reference local oscillator and in which the frequency is equal to F1−F0 and/or F1+F0.

The frequency transposition is preferably an analog transposition, preferably only analog. This makes it possible to reduce the manufacturing costs of the add-on RFID device.

In a particularly advantageous manner, this add-on RFID makes it possible to use a standard reader in RFID systems that require readers with adapted communication frequencies. Due to the configuration of the add-on RFID device, there is no need to change the infrastructure of the RFID system already in place.

The invention thus makes it possible to bring the interrogation and/or energy signal as close as possible to the transponder by means of repeaters, without creating interference phenomena in the repeater and without changing the pre-existing RFID reader/interrogator or by using a standard RFID reader/interrogator. Furthermore, the invention does not necessarily require a complex system which uses directional antennas.

The invention this makes it possible to increase the distance or the accuracy of communication between the RFID reader and the transponder while keeping costs low.

Since the frequency transpositions are carried out in an analog manner, there is no need to know the frequency F0 by measurement. This allows the add-on RFID device to have a simplified infrastructure.

According to another aspect, the present invention relates to an RFID terminal for a system for electromagnetic interrogation of RFID transponders, the RFID terminal being configured to emit an interrogation signal at a frequency F1 intended for being received by at least one RFID device referred to as repeater or by the at least one RFID transponder, characterised in that the at least one RFID terminal includes at least one RFID reader configured to emit an interrogation signal with frequency F0 and at least one add-on RFID device, configured to perform an exclusively analog frequency transposition from the frequency F0 to the frequency F1, the frequencies F0 and F1 being different. Optionally, the terminal includes a housing inside of which the RFID reader and the add-on RFID device are housed.

Advantageously, this type of RFID terminal is configured to be able to communicate with various types of RFID devices in which the communication frequencies are not frequencies equal to or near 900 MHz.

According to another aspect, the present invention relates to an add-on RFID device for a system for electromagnetic interrogation of RFID transponders which can be interrogated by an RFID reader, the add-on RFID device being configured to:
receive an interrogation signal at the frequency F0 emitted by at least one RFID reader;
transpose said interrogation signal with frequency F0 to a frequency F1 different from F0, said interrogation signal with frequency F1 being intended for being received by at least one signal repeater or at least one transponder.

In order to transpose said interrogation signal with frequency F0 to a frequency F1, the at least one add-on RFID device is configured to perform an exclusively analog frequency transposition from the frequency F0 to the frequency F1, the at least one add-on RFID device comprising a generator of reference signals and the exclusively analog frequency transposition comprising mixing said interrogation signal with frequency F0 with a reference signal generated by said generator of reference signals with a frequency F1−F0 and/or F1+F0 so as to obtain a signal with frequency F1 at the output of the add-on RFID device.

The add-on RFID device allows a standard reader to interface with any type of RFID device, despite the different communication frequencies between the standard RFID reader and the RFID device.

BRIEF DESCRIPTION OF THE FIGURES

The goals and objectives as well as the characteristics and advantages of the invention will better emerge from the detailed description of an embodiment of the latter which is illustrated by the following appended drawings wherein.

Figure 1A:
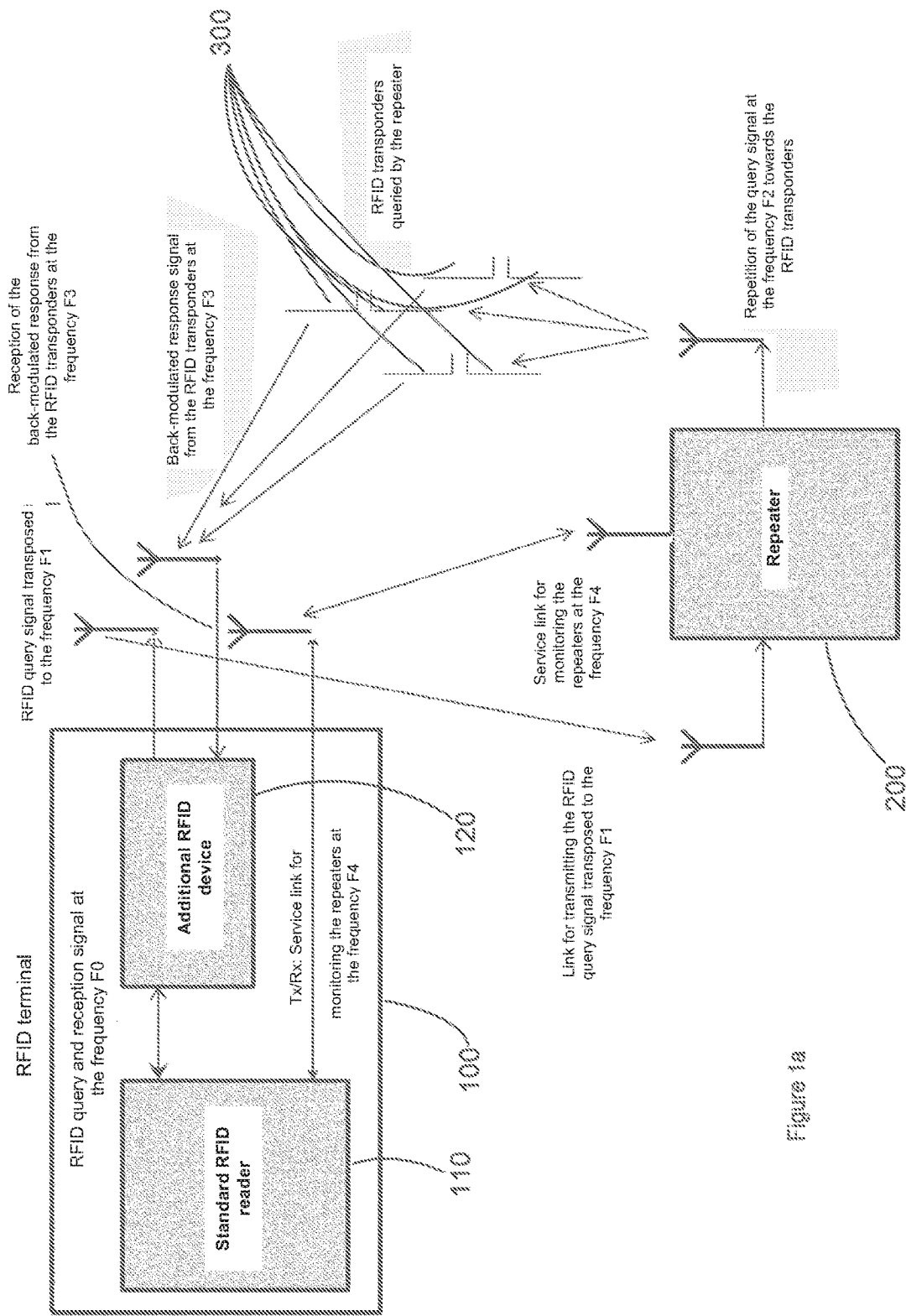
FIG. 1a shows a simplified diagram of the interactions between the elements of a system of the invention, according to one embodiment.

The drawings are given as examples and are not limiting to the invention. These are schematic drawings intended to facilitate the understanding of the invention and are not necessarily at the same scale of the practical applications.

DETAILED DESCRIPTION OF THE INVENTION

It is specified that, in the context of the present invention, the terms "RFID tag", "RFID transponder" and the like define any device which comprises at least one antenna and an electronic microchip containing data, and is configured to communicate with a reading device by electromagnetic waves in order for said reader to be able to read said data contained in the electronic microchip.

It is specified that, in the context of the present invention, the terms "Passive RFID tag", "Passive RFID transponder" and the like define any RFID transponder which is powered by an electromagnetic wave, likewise described as a remotely powered RFID transponder.

It is specified that, in the context of the present invention, the terms "Active RFID tag", "Active RFID transponder" and the like define any RFID transponder which is powered by its own energy source and/or a local energy source, likewise described as a self-powered RFID transponder.

It is specified that, in the context of the present invention, the term "RFID reader", "RFID interrogator" or the like define a device configured to communicate via electromagnetic waves having one or more RFID devices, for example such as one or more RFID transponders.

It is specified that, in the context of the present invention, the term "RFID reader", "standard RFID interrogator" or the like define a device configured to communicate via electromagnetic waves with one or more RFID devices, for example such as one or more RFID transponders.

The terms "standard RFID reader", "standard RFID interrogator" or the like define an RFID reader communicating on the basis of regulated, standardised communication protocols (EPC UHF Gen2 standard and ISO 18000-6 standard); this type of standard RFID reader is readily available from most distributors of RFID readers.

Thus, according to the EPC UHF Gen2 standard and the ISO 18000-6 standard, a "standard RFID reader" emits and reads signals with frequencies comprised between 840 MHz and 960 MHz depending on the geographical areas in which the UHF RFID system is used. Thus, in the USA, the UHF band assigned to UHF applications is comprised between 902 and 928 MHz, while it is comprised between 866 and 868 MHz in Europe. China authorises frequencies comprised between 840 and 844 MHz and Japan authorises frequencies comprised between 952 MHz and 958 MHz.

It is specified that, in the context of the present invention, the term "standard monostatic RFID reader" or the equivalents thereof define a standard RFID reader comprising at least one single communication port configured to emit electromagnetic interrogation signals and to receive electromagnetic response signals.

It is specified that, in the context of the present invention, the terms "standard bistatic RFID reader" or the like define a standard RFID reader comprising at least two communication ports, one configured to emit electromagnetic interrogation signals and the other configured to receive electromagnetic response signals.

It is specified that, in the context of the present invention, the terms "quasi-synchronous signals" or the like define signals in which the frequencies do not differ from one another by more than 500 Hz.

It should be noted that the present invention proposes a solution in which the power nodes are repeaters that do not have a processor and that are configured to repeat the interrogation signals coming from an improved reader/interrogator. The proposed solution makes it possible in particular to considerably reduce the latency as well as to improve the reading performance.

Before going into the details of the preferred embodiments, more particularly with reference to the figures, different options that the invention may display preferentially but not restrictively, wherein these options may be implemented either alone or in any combination, are enumerated hereunder:

Advantageously, the at least one RFID transponder is configured to be powered by signals with frequency $F2$. This makes it possible to use standard RFID transponders when the frequency $F2$ is close to 900 MHz.

Advantageously, said repeated interrogation signal with frequency $F2$ emitted by the at least one repeater and received by the at least one RFID transponder supplies enough energy to said RFID transponder for the latter to emit said backscattered response signal with frequency $F3$. This makes it possible to power passive RFID transponders remotely with only the interrogation signals repeated by the repeaters.

The generator of reference signals of the at least one repeater advantageously includes a reference local oscillator in which the frequency is equal to $F1-F2$ and/or $F1+F2$. This makes it possible locally to have a reference signal which, once mixed with the interrogation signal with frequency $F1$, produces a repeated interrogation signal with frequency $F2$.

At least one add-on RFID transponder is advantageously associated with the at least one repeater so as to allow control of the at least one repeater by the at least one RFID terminal via a communication channel comprising said add-on RFID transponder associated with the at least one repeater. This makes it possible to establish a service communication channel between the RFID terminal and the repeater in order to be able to control the repeater and to obtain information regarding, for example, its status. The use of an add-on RFID transponder makes it possible to use the communication systems already provided in the RFID terminal to communicate without adding any additional hardware.

The at least one standard RFID reader of the at least one RFID terminal is advantageously configured to emit interrogation signals with frequency $F0$, and the at least one RFID terminal includes at least one add-on RFID device connected to the at least one standard RFID reader and configured to transpose the interrogation signals with frequency $F0$ emitted by the at least one standard RFID reader into interrogation signals with frequency $F1$ intended for being received by the at least one repeater. This makes it possible, by simply adding this add-on RFID device to any standard RFID reader, to implement the present invention in an existing RFID system.

Advantageously, the at least one add-on RFID device is configured to perform an exclusively analog transposition of the interrogation signals with frequency $F0$ into interrogation signals with frequency $F1$. This makes it possible to communicate with RFID devices that do not have a standard communication frequency.

Advantageously, the at least one standard RFID reader comprises at least one common communication port, for receiving backscattered response signals emitted by the at least one RFID transponder and for emitting interrogation signals, to which the at least one add-on RFID device is connected. This makes it possible to use a standard monostatic RFID reader.

Advantageously, the at least one RFID terminal 100 includes at least one of the following elements:
A standard monostatic UHF Gen2 RFID reader;
A circulator making it possible to isolate the response signal backscattered by the at least one RFID transponder;
A generator of reference signals at the frequency $F1-F0$ and/or $F1+F0$ which, mixed with the interrogation signal at the frequency $F0$, produces an interrogation signal with frequency $F1$;
An analog mixer of the interrogation signal with frequency $F0$ and the reference signal with frequency $F1-F0$ and/or $F1+F0$;
An antenna configured to transmit the interrogation signal with frequency $F1$ towards the at least one repeater;
A power amplifier powering the antenna, configured to emit interrogation signals with frequency $F1$;
An antenna configured to receive the backscattered response signal with frequency $F3$ coming from the at least one RFID transponder;
An amplifier of the backscattered response signal with frequency $F3$;
Optionally, a system for measuring the frequency offset between the interrogation signal emitted by the at least one standard RFID reader with frequency $F0$ and the response signal backscattered by the at least one RFID transponder with frequency $F3$;
A control unit managing the at least one RFID terminal.

Optionally, the terminal includes a service communication channel allowing the at least one RFID terminal to communicate, for emitting and receiving, with the at least one repeater via an antenna adapted to the service frequency $F4$, the frequency $F4$ being different from the frequency $F1$.

Advantageously, the at least one RFID terminal includes at least one of the following elements:
A standard bistatic UHF Gen2 RFID reader;
A generator of reference signals at the frequency $F1-F0$ and/or $F1+F0$ which, mixed with the interrogation signal at the frequency $F0$, produces an interrogation signal with frequency $F1$;
An analog mixer of the interrogation signal with frequency $F0$ and the reference signal with frequency $F1-F0$ and/or $F1+F0$;
An antenna configured to transmit the interrogation signal with frequency $F1$ towards the at least one repeater;
A power amplifier powering the antenna, configured to emit interrogation signals with frequency $F1$;
An antenna configured to receive the backscattered response signal with frequency $F3$ coming from the at least one RFID transponder;

An amplifier of the backscattered response signal with frequency F3;

Optionally, a system for measuring the frequency offset between the interrogation signal emitted by the at least one standard RFID reader with frequency F0 and the response signal backscattered by the at least one RFID transponder with frequency F3;

A control unit managing the at least one RFID terminal.

Optionally, the terminal includes a service communication channel allowing the at least one RFID terminal to communicate with the at least one repeater via two antennas adapted to the service frequency, one for receiving and one for emitting.

Advantageously, and without this being necessary, the reference local oscillator is temperature-compensated. This makes it possible to maintain the maximum reading performance of the standard RFID reader, since the closer the frequencies F0, F2 and F3 are, the better the reading of the backscattered response signals will be.

Advantageously and optionally, the at least one RFID terminal includes a system for measuring the frequency offset between the interrogation signal with frequency F0 and the backscattered response signal with frequency F3 by the at least one RFID transponder. This makes it possible, via the service communication channel, to control the repeater so as to reduce said frequency offset in order to maintain the best possible reading performance.

Advantageously, the at least one RFID terminal includes a service communication channel which allows the at least one RFID terminal to communicate with the at least one repeater via at least one antenna adapted to the service frequency F4. This makes it possible to control the repeater.

Advantageously, the control unit of the at least one RFID terminal is configured to send control data towards the at least one repeater via the service communication channel. This makes it possible to control the repeater.

Advantageously, the at least one repeater performs only one frequency transposition. This makes it possible to obtain an inexpensive repeater and to avoid self-blindness phenomena.

The at least one repeater advantageously includes at least one of the following elements:

A receiving antenna configured to receive the interrogation signal with frequency F1 emitted by the at least one RFID terminal;

At least one emitting antenna configured to emit the repeated interrogation signal with frequency F2 towards the at least one RFID transponder;

The add-on RFID transponder configured to receive and emit the service signals at the frequency F4.

A control unit managing the control data received from the at least one RFID terminal via the service communication channel at the frequency F4 and/or using Bluetooth Low Energy;

A variable-gain amplifier controlled by the control unit;

A generator of reference signals at the frequency F1−F2 and/or F1+F2 which, mixed with received interrogation signal at the frequency F1 produces a repeated interrogation signal with frequency F2, and which is controlled by the control unit;

A reference local oscillator in which the frequency has the same value as the frequency of the reference local oscillator of the at least one RFID terminal;

An analog mixer of the received interrogation signal with frequency F1 with the reference signal with frequency F1−F2 and/or F1+F2, configured to output a repeated interrogation signal with frequency F2;

A power amplifier powering the antenna, configured to emit the interrogation signal with frequency F2;

An antenna configured to emit and receive the service signals at the frequency F4;

At least one electric power source.

Advantageously, the frequencies F0, F2 and F3 are equal. This makes it possible to improve the reading accuracy and performance.

Advantageously, the frequencies F0, F2, F3 and F4 are equal. This makes it possible to improve the reading accuracy and performance.

Advantageously, said signals with frequencies F0, F2 and F3 are quasi-synchronous; i.e., the frequency gap between the frequencies F0, F2 and F3 is less than 500 Hz. This makes it possible to improve the reading accuracy and performance.

A single signal is advantageously emitted by the at least one repeater towards the at least one RFID transponder at a frequency F2. This makes it possible to remotely power the RFID transponder with the repeated interrogation signal with frequency F2.

Advantageously, said repeated interrogation signal emitted by the at least one repeater at a frequency F2 includes a carrier which is used to supply energy to the at least one RFID transponder and an amplitude modulation of said carrier, said amplitude modulation being used to repeat said interrogation signal emitted by the at least one RFID terminal with frequency F1. This makes it possible to remotely power the RFID transponder with the repeated interrogation signal with frequency F2.

Advantageously, the frequency F1 is preferably comprised between 2.446 GHz and 2.454 GHz in Europe, advantageously between 2.4 GHz and 2.4835 GHz in the United States and preferably is equal to 2.45 GHz.

Advantageously, the frequency F2 is comprised between 866 MHz and 867 MHz in Europe and between 902 MHz and 928 MHz in the United States.

Advantageously, the frequency F0 is comprised between 866 MHz and 867 MHz in Europe and between 902 MHz and 928 MHz in the United States.

At least one add-on RFID transponder is advantageously associated with the repeater and provides a service communication channel between the repeater and the at least one RFID terminal. The use of an add-on RFID transponder makes it possible to use the communication systems already provided in the RFID terminal to communicate without adding any additional hardware.

The service communication channel which allows the at least one RFID terminal to communicate with the at least one repeater advantageously includes at least one antenna adapted to the service frequency F4.

Advantageously, the RFID terminal is configured so that the interrogation signal with frequency F0 emitted by the standard monostatic RFID reader transits via a high-isolation circulator, passes through a directional coupler to seek the frequency F1, is then mixed in an analog mixer with the reference signal with frequency F1−F0 and/or F1+F0 so that, at the output of said mixer, said interrogation signal has, as its frequency, the frequency F1, and is then amplified and emitted by the RFID terminal towards at least one repeater.

Advantageously, the RFID terminal is configured so that the backscattered response signal with frequency F3 received by the RFID terminal is first amplified and then transits via a directional coupler to seek the frequency F3 before passing through a high-isolation circulator so as to be separated from the interrogation signals emitted by the standard RFID reader.

Advantageously, the RFID terminal is configured so that the interrogation signal with frequency F0 emitted by the standard bistatic RFID reader passes through a directional coupler to seek the frequency F1, is then mixed in an analog mixer with the reference signal with frequency F1−F0 and/or F1+F0 so that, at the output of said mixer, said interrogation signal has, as its frequency, the frequency F1, and is then amplified and emitted by the RFID terminal towards at least one repeater.

Advantageously, the RFID terminal is configured so that the backscattered response signal with frequency F3 received by the RFID terminal is first amplified and then transits via a directional coupler to seek the frequency F3.

The generator of reference signals of the at least one repeater advantageously includes a reference local oscillator and the reference local oscillator of the at least one repeater is temperature-compensated so that the frequency thereof has the same value as the frequency of the reference signal of the at least one RFID terminal.

At least one add-on RFID transponder is advantageously associated with the repeater and provides a service communication channel between the repeater and the at least one RFID terminal. This allows communication between the RFID terminal and the repeater.

Said add-on RFID transponder is advantageously configured to receive instructions contained in the control data of the RFID terminal, and the repeater is configured to perform at least one action as a function of said instruction, said instruction being taken from the following: activating the repeater, deactivating the repeater, verifying the level of charge and the cycles of at least one electric power source of the repeater, controlling the frequency of the repeated interrogation signal with frequency F2, controlling the emission power of the repeated interrogation signal with frequency F2, and controlling the gain of the receiver of the interrogation signal with frequency F1. This makes it possible to control the repeater by the RFID terminal.

The repeater advantageously has N>1 interrogation channels configured to repeat interrogation signals with frequency F2, each channel being connected to a separate antenna. This makes it possible to extend the space of action of a single repeater.

Advantageously, said RFID transponder is configured to receive instructions contained in the control data of the RFID terminal and the repeater is configured to perform at least one action as a function of said instruction, said instruction being the activation of one interrogation channel at the frequency F2 among N available channels of the repeater. This makes it possible to decide what area of the space covered by the repeater is to be interrogated by the RFID terminal.

The repeater advantageously has at least one interrogation antenna at the frequency F2, the radiation of which is controlled by the at least one RFID terminal, allowing the at least one RFID transponder to be located by scanning the interrogation space. This allows the transponders to be located.

Advantageously, the frequency gap between the frequencies F0 and F2, between the frequencies F0 and F3 and between the frequencies F2 and F3 is lower than 1000 Hz, advantageously lower than 500 Hz. This makes it possible to improve the reading accuracy and performance.

The at least one add-on RFID device advantageously performs only one frequency transposition. This makes it possible to communicate with RFID devices having frequencies that are far from 900 MHz.

The at least one add-on RFID device advantageously includes at least one of the following elements:

A generator of reference signals at the frequency F1−F0 and/or F1+F0 which, mixed with interrogation signal at the frequency F0, produces an interrogation signal with frequency F1;

A generator of reference signals at the frequency F3−F0 and/or F3+F0 which, mixed with the backscattered response signal at the frequency F3, produces a response signal with frequency F0;

An analog mixer of the interrogation signal with frequency F0 and the reference signal with frequency F1−F0 and/or F1+F0;

An analog mixer of the backscattered response signal with frequency F3 and the reference signal with frequency F3−F0 and/or F3+F0;

An antenna configured to transmit the interrogation signal with frequency F1 towards the at least one repeater;

A power amplifier powering the antenna, configured to emit interrogation signals with frequency F1;

An antenna configured to receive the backscattered response signal with frequency F3 coming from the at least one RFID transponder;

An amplifier of the backscattered response signal with frequency F3;

Optionally, a system for measuring the frequency offset between the interrogation signal emitted by the at least one RFID reader with frequency F0 and the response signal backscattered by the at least one RFID transponder with frequency F3;

A control unit managing the at least one RFID terminal.

A service communication channel allowing the at least one RFID terminal to communicate, for emitting and receiving, with the at least one repeater via an antenna adapted to the service frequency F4, the frequency F4 being different from the frequency F1.

The generator of reference signals of the at least one add-on RFID device advantageously includes a reference local oscillator and the reference local oscillator of the at least one add-on RFID device is temperature-compensated so that the frequency thereof has the same value as the frequency of the reference signal of the at least one repeater. This allows the repeater to repeat the signal sent to the transponder in an analog manner. This makes it possible to maintain the quasi-synchronicity between certain signals.

The at least one RFID reader advantageously comprises at least one common communication port for receiving backscattered response signals emitted by the at least one RFID transponder and for emitting interrogation signals to which the at least one add-on RFID device is connected. This makes it possible to use the add-on RFID device with a monostatic RFID reader.

Said interrogation signal emitted by the at least one add-on RFID device at a frequency F1 advantageously includes an amplitude modulation of a carrier, said amplitude being useful for transmitting said interrogation signal emitted by the at least one RFID reader with frequency F0. This makes it possible to transmit an interrogation signal via the amplitude modulation towards the at least one repeater.

The add-on RFID device is advantageously configured to perform a frequency transposition of a signal with frequency F0 into a signal with frequency F1, regardless of the type of modulation of the signal with frequency F0. This makes it possible to carry out the frequency transposition on any type of modulated signal.

A single signal is advantageously emitted by the at least one add-on RFID device towards the at least one repeater at a frequency F1. The repeater does not need to be powered; it has its own power source. This makes it possible to reduce the emission power of the RFID terminal and the emission time thereof.

Advantageously, the frequencies F0 and F1 are different.

The generator of reference signals of the at least one add-on RFID device advantageously includes a reference local oscillator in which the frequency is equal to F1−F0 and/or F1+F0. This makes it possible to transpose the frequency F0 to the frequency F1 in an analog manner by mixing a reference signal with frequency F1−F0 and/or F1+F0 with the interrogation signal with frequency F0. This makes it possible to ensure the quasi-synchronicity between the interrogation signal with frequency F0 and the interrogation signal with frequency F1.

Advantageously, the RFID terminal is configured so that the interrogation signal with frequency F0 emitted by the RFID reader passes through a directional coupler to seek the frequency F1, is then mixed in an analog mixer with the reference signal with frequency F1−F0 and/or F1+F0 so that, at the output of said mixer, said interrogation signal has, as its frequency, the frequency F1, and is then amplified and emitted by the RFID terminal towards at least one repeater.

Advantageously, the RFID terminal is configured so that the backscattered response signal with frequency F3 received by the RFID terminal transits via a directional coupler to seek the frequency F3 before passing through a high-isolation circulator so as to be separated from the interrogation signals emitted by the RFID reader.

Advantageously, the frequency F0 is comprised between 866 MHz and 867 MHz in Europe and between 902 MHz and 928 MHz in the United States, and the frequency F1 is preferably comprised between 2.446 GHz and 2.454 GHz in Europe, advantageously between 2.4 GHz and 2.4835 GHz in the United States and preferably is equal to 2.45 GHz.

The add-on RFID device is advantageously connected in a wired manner to the at least one RFID reader.

The repeater advantageously includes at least one add-on RFID transponder and at least one add-on antenna adapted to a service frequency F4, the add-on RFID transponder and the add-on antenna are configured to establish a service communication channel with frequency F4 between the repeater and the at least one RFID terminal so as to allow control of the at least one repeater by the at least one RFID terminal, the frequency F4 being different from the frequency F1, and the control data include at least one instruction taken from the following: activating the repeater, deactivating the repeater, verifying the level of charge and cycles of at least one electric power source of the repeater, controlling the frequency of the repeated interrogation signal with frequency F2, controlling the emission power of the repeated interrogation signal with frequency F2, and controlling the gain of the receiver of the interrogation signal with frequency F1.

The repeater advantageously includes the following elements:
  A receiving antenna configured to receive said interrogation signal with frequency F1 emitted by the at least one RFID terminal;
  At least one emitting antenna configured to emit the repeated interrogation signal with frequency F2 towards the at least one RFID transponder;
  Said generator of reference signals at the frequency F1−F2 and/or F1+F2;
  An analog mixer of said received interrogation signal with frequency F1 and said reference signal with frequency F1−F2 and/or F1+F2, configured to output a repeated interrogation signal with frequency F2;
  A control unit managing said control data received from the at least one RFID terminal via said service communication channel at the frequency F4;
  The add-on RFID transponder configured to receive and emit the service signals at the frequency F4.
  The add-on antenna configured to emit and receive the service signals at the frequency F4.

The repeater advantageously has N>1 interrogation channels configured to transmit the repeated interrogation signal with frequency F2, each channel comprising a separate antenna, each antenna being configured to emit a repeated interrogation signal at the frequency F2.

Advantageously, the associated add-on RFID transponder is configured to receive instructions contained in the control data of the RFID terminal and the repeater is configured to perform at least one action as a function of said instruction, said instruction being the activation of an interrogation channel at the frequency F2 among the N available channels of the repeater.

The radiation of the at least one interrogation antenna at the frequency F2 is advantageously controlled by the at least one RFID terminal via the service communication channel at the frequency F4, allowing the at least one RFID transponder to be located by scanning the interrogation space.

Advantageously, the frequency F1 is preferably comprised between 2.446 GHz and 2.454 GHz, advantageously between 2.4 GHz and 2.4835 GHz and preferably is equal to 2.45 GHz, the frequency F2 is comprised between 866 MHz and 867 MHz or between 902 MHz and 928 MHz, the frequency F0 is comprised between 866 MHz and 867 MHz or between 902 MHz and 928 MHz, the frequency F3 is comprised between 866 MHz and 867 MHz or between 902 MHz and 928 MHz and the frequency F4 is comprised between 866 MHz and 867 MHz or between 902 MHz and 928 MHz.

The RFID reader is advantageously a bistatic UHF Gen2 RFID reader, and the at least one RFID terminal includes the following elements:
  A generator of reference signals at the frequency F1−F0 and/or F1+F0 which, mixed with interrogation signal at the frequency F0, produces an interrogation signal with frequency F1;
  An analog mixer of the interrogation signal with frequency F0 and the reference signal with frequency F1−F0 and/or F1+F0;

An antenna configured to transmit the interrogation signal with frequency F1 towards the at least one repeater;

An antenna configured to receive the response signal with frequency F3 coming from the at least one RFID transponder;

A system for measuring the frequency offset between the interrogation signal emitted by the at least one RFID reader with frequency F0 and the response signal backscattered by the at least one RFID transponder with frequency F3;

A service communication channel allowing the at least one RFID terminal to communicate with the at least one repeater by emitting via a first antenna adapted to a service frequency F4 and by receiving via a second antenna adapted to a frequency F4.

The RFID reader is advantageously a monostatic UHF Gen2 RFID reader, and the at least one RFID terminal includes the following elements:

A circulator making it possible to isolate the response signal backscattered by the at least one RFID transponder;

A generator of reference signals at the frequency F1−F0 and/or F1+F0 which, mixed with interrogation signal at the frequency F0, produces an interrogation signal with frequency F1;

An analog mixer of the interrogation signal with frequency F0 and the reference signal with frequency F1−F0 and/or F1+F0;

An antenna configured to transmit the interrogation signal with frequency F1 towards the at least one repeater;

An antenna configured to receive the response signal with frequency F3 coming from the at least one RFID transponder;

A system for measuring the frequency offset between the interrogation signal emitted by the at least one RFID reader with frequency F0 and the response signal backscattered by the at least one RFID transponder with frequency F3;

A service communication channel allowing the at least one RFID terminal to communicate, for emitting and receiving, with the at least one repeater via an antenna adapted to the service frequency F4.

The generator of reference signals of the at least one repeater advantageously includes a reference local oscillator in which the frequency is equal to F1−F2 and/or F1+F2 so as to provide said repeated interrogation signal with frequency F2.

The repeater advantageously only performs the following steps: amplifying the interrogation signal with frequency F1, transposing the frequency F1 of the amplified interrogation signal towards the frequency F2; amplifying the repeated interrogation signal with frequency F2; and receiving and executing control data received from the RFID terminal.

The add-on RFID device advantageously includes the following elements:

A generator of reference signals at the frequency F1−F0 and/or F1+F0 which, mixed with interrogation signal at the frequency F0, produces an interrogation signal with frequency F1;

An analog mixer of the interrogation signal with frequency F0 and the reference signal with frequency F1−F0 and/or F1+F0;

An antenna configured to transmit the interrogation signal with frequency F1 towards the at least one repeater;

An amplifier of the response signal with frequency F3;

A system for measuring the frequency offset between the interrogation signal emitted by the at least one RFID reader with frequency F0 and the response signal backscattered by the at least one RFID transponder with frequency F3;

Advantageously, the RFID terminal is configured so that the interrogation signal with frequency F0 emitted by the RFID reader passes through a directional coupler to seek the frequency F1, is then mixed in an analog mixer with the reference signal with frequency F1−F0 and/or F1+F0 so that, at the output of said mixer, said interrogation signal has, as its frequency, the frequency F1, and is then amplified and emitted by the RFID terminal towards at least one repeater, and the backscattered response signal with frequency F3 received by the RFID terminal transits via a directional coupler to seek the frequency F3 before passing through a high-isolation circulator so as to be separated from the interrogation signals emitted by the RFID reader.

Advantageously, the frequency F1 is preferably comprised between 2.446 GHz and 2.454 GHz, advantageously between 2.4 GHz and 2.4835 GHz and preferably is equal to 2.45 GHz, the frequency F2 is comprised between 866 MHz and 867 MHz or between 902 MHz and 928 MHz, the frequency F0 is comprised between 866 MHz and 867 MHz or between 902 MHz and 928 MHz and the frequency F3 is comprised between 866 MHz and 867 MHz or between 902 MHz and 928 MHz.

The RFID reader is advantageously a bistatic UHF Gen2 RFID reader, and the at least one RFID terminal includes the following elements:

A generator of reference signals at the frequency F1−F0 and/or F1+F0 which, mixed with interrogation signal at the frequency F0, produces an interrogation signal with frequency F1;

An analog mixer of the interrogation signal with frequency F0 and the reference signal with frequency F1−F0 and/or F1+F0;

An antenna configured to transmit the interrogation signal with frequency F1 towards the at least one repeater;

An antenna configured to receive the response signal with frequency F3 coming from the at least one RFID transponder;

A system for measuring the frequency offset between the interrogation signal emitted by the at least one RFID reader with frequency F0 and the response signal backscattered by the at least one RFID transponder (300) with frequency F3;

The RFID reader is advantageously a monostatic UHF Gen2 RFID reader, and the at least one RFID terminal includes the following elements:

A circulator making it possible to isolate the response signal backscattered by the at least one RFID transponder;

A generator of reference signals at the frequency F1−F0 and/or F1+F0 which, mixed with interrogation signal at the frequency F0, produces an interrogation signal with frequency F1;

An analog mixer of the interrogation signal with frequency F0 and the reference signal with frequency F1−F0 and/or F1+F0;

An antenna configured to transmit the interrogation signal with frequency F1 towards the at least one repeater;

An antenna configured to receive the response signal with frequency F3 coming from the at least one RFID transponder;

A system for measuring the frequency offset between the interrogation signal emitted by the at least one RFID reader with frequency F0 and the response signal backscattered by the at least one RFID transponder with frequency F3;

The at least one repeater advantageously includes the following elements:

A receiving antenna configured to receive said interrogation signal with frequency F1 emitted by the at least one RFID terminal;

At least one emitting antenna configured to emit the repeated interrogation signal with frequency F2 towards the at least one RFID transponder;

said generator of reference signals at the frequency F1−F2 and/or F1+F2;

An analog mixer of said received interrogation signal with frequency F1 and said reference signal with frequency F1−F2 and/or F1+F2, configured to output a repeated interrogation signal with frequency F2;

Advantageously, the at least one additional device includes a generator of reference signals and the exclusively analog frequency transposition includes mixing said interrogation signal with frequency F0 with a reference signal generated by said generator of reference signals at a frequency F1−F0 and/or F1+F0 so as to supply said interrogation signal with frequency F1.

The at least one add-on RFID device advantageously performs only: a transposition from the frequency F0 of the interrogation signal to the frequency F1, an amplification of the interrogation signal with frequency F1, and an amplification of the backscattered response signal with frequency F3.

In an RFID system, the standard RFID reader transmits an amplitude-modulated carrier to the RFID transponder. Since the RFID transponder is passive, the latter merely reflects the incident wave from the reader without modifying the frequency thereof. Said incident wave energises the circuit of the RFID transponder so as to allow the memory thereof to be read. These data are then retransmitted in the backscattered wave modulation.

As a consequence thereof, the standard RFID reader recovers the wave backscattered by the RFID transponder, which advantageously has exactly the same frequency but with an amplitude modulation containing information of the RFID transponder, in particular the memory contents thereof.

The standard RFID reader performs a synchronous demodulation by multiplying the signal received by reflection of the RFID transponder to the local oscillator. Since the two signals have the same frequency, the baseband transposition by said multiplication as well as low-pass filtering only make it possible to recover the information modulated by the RFID transponder without the carrier.

Whenever any RFID element is sought to be inserted between the interrogation signal of the standard RFID reader and the RFID transponder, there may be a loss of reading performance of the RFID reader. This comes from the frequency offset which can take place when an additional element is inserted between the interrogation signal of the standard RFID reader and the RFID transponder.

In order to benefit from the best performance of the RFID reader, it is important for the frequency of the interrogation signal of the standard RFID reader and the frequency of the backscattered response signal of the RFID transponder to be as similar as possible. Indeed, this frequency gap should not exceed 1 kHz in a carrier with a frequency comprised between 866 MHz and 867 MHz in Europe and between 902 MHz and 928 MHz in the United States. They do not need to be at exactly the same frequency, but only within 1 ppm (parts per million), which is broadly enough for an RFID system.

There are two operating modes for an RFID system, the "Open Loop" mode and the "Closed Loop" mode.

According to the open-loop mode, the standard RFID reader is only used as a reader; it does not interrogate the RFID transponders. Therefore, in an open-loop mode, the transponders are only energised, either by the actual reader or by any other RFID device such as, for example, a power node. Thus, no command is sent to the RFID transponders; they only receive an energisation signal. The RFID transponders therefore merely emit a backscattered signal. The reader then receives said backscattered signal.

According to the closed-loop mode, the standard RFID reader emits an interrogation signal towards the RFID transponders. This signal can be relayed and/or repeated by one or more RFID devices in order to reach the RFID transponders. Said interrogation signal includes a series of instructions which are then executed by the RFID transponders. In response to this interrogation signal, the RFID transponders then emit a backscattered response signal towards the RFID reader. This backscattered response signal can be relayed and/or repeated by RFID devices. According to this operating mode, the transponders receive an interrogation signal and not only an energisation signal. This mode then makes it possible to communicate with the transponders according to the internal configuration thereof: the reader interrogates and the transponders respond.

According to one embodiment, the present invention includes the use of a so-called add-on RFID element or add-on RFID device connected in a wired and/or wireless manner to a standard RFID reader. The combination of the standard RFID reader and the add-on RFID device is referred to as RFID terminal. This add-on RFID device ensures a transposition of the frequency F0 of the interrogation signal emitted by the standard RFID reader towards an unlicensed authorised frequency F1, for example such as the 2.45 GHz ISM band. The frequency F0 is preferably comprised between 866 MHz and 867 MHz in Europe and between 902 MHz and 928 MHz in the United States. Then, the interrogation signal with frequency F1 is transmitted to a so-called repeater RFID device. The repeater has the sole function of repeating the interrogating signal from the RFID terminal towards one or more RFID transponders after having carried out an analog frequency transposition of the interrogation signal. Thus, the interrogation signal is received by the repeater at a frequency F1 and is repeated to one or more RFID transponders at a frequency F2. After receiving said repeated interrogation signal with frequency F2, the transponders are configured to emit a backscattered response at a frequency F3; F3 is advantageously equal to F2. Said backscattered response signal with frequency F3 is then received by the RFID terminal. Advantageously, the frequency F3 is equal to the frequency F0. This is followed by a demodulation step, as mentioned above.

However, due to the analog frequency transposition from the frequency F1 to the frequency F2, the repeater includes a generator of reference signals comprising a reference local oscillator, advantageously temperature-compensated. This is different from that which is included in the RFID reader, and a frequency offset can appear. As introduced beforehand, this frequency offset can result in a loss of reading performance. In order to correct this, a service communication channel is set up between the RFID terminal and the repeater. This service communication channel enables, among others, an adjustment of the reference local oscillator of the repeater in order to reduce the frequency offset between the frequency F3 and the frequency F0, when the frequency F3 is equal to the frequency F2. This service communication channel is provided by a wired and/or wireless link, such as Bluetooth and/or RFID and/or any other communication system. In the case of RFID communication between the RFID terminal and the repeater, the communication frequency F4 is advantageously equal to the frequency F0.

According to one embodiment of the present invention, the frequencies F2 and F0 do not differ by more than 500 Hz, the interrogation signals with frequency F0 and the interrogation signals with frequency F2 forming quasi-synchronous signals. For this purpose, temperature-compensated, high-stability local oscillators are embedded in the repeaters and the frequencies are monitored and adjusted via the service communication channel at regular time intervals in order to compensate for any time drift. The measurement is carried out in the RFID terminal by measuring the frequency difference between the UHF signal emitted by the standard RFID reader at the frequency F0 and that received at the frequency F3 of the RFID transponders and thus of the repeater in question when the frequency F2 is equal to the frequency F3. According to the measured difference, a correction value is sent to the repeater via the service communication channel. The extraction of the two frequencies is carried out, for example, by means of directional couplers with very low insertion losses.

According to one advantageous embodiment, the interrogation signals with frequency F0, the repeated interrogation signals with frequency F2 and the backscattered response signals with frequency F3 are quasi-synchronous (i.e. the frequency difference between the frequencies F0 and F2, between the frequencies F0 and F3 and between the frequencies F2 and F3, is less than 500 Hz).

Thus, the present invention includes an RFID system which can operate in a closed loop with RFID transponders located at distances which do not allow the interrogation signal to be received without using repeaters. Advantageously, the present invention makes it possible to interrogate RFID transponders located at a distance of 30 meters from the RFID terminal in free-field propagation conditions.

All this happens as if the standard RFID reader communicates directly with the RFID transponders. The add-on RFID device and the network of repeaters, due to their simplicity, are transparent to normal operations of RFID transponder interrogation by the standard RFID reader. The circuit for transposing the interrogation signal F0 to F1, the propagation thereof from an emitting antenna at a frequency F1 of the RFID terminal towards the receiving antenna of the repeater separated by 10 to 30 meters and then the transposition thereof by a simple mixer at a frequency F2 followed by amplification in order to be radiated locally towards the RFID transponders around the repeater only increase the travel time by less than one microsecond ($10^{-6}$ second).

When a device receives a signal with frequency F via a receiving antenna and emits said same signal at the same frequency F via an emitting antenna after amplification, a so-called self-blindness phenomenon can occur. This phenomenon consists of the receiving antenna receiving the amplified signal emitted by the emitting antenna. Indeed, since the frequencies are identical, the emitting antenna is configured to receive a signal at the frequency F, and thus the amplified signal with frequency F emitted by the emitting antenna can be received by the receiving antenna. In this situation, the reception of the device is greatly disrupted by the emission of the amplified signal from said same device. This phenomenon is similar to the Larsen effect, which is generally known in the field of acoustics. To avoid this type of problem, it is necessary to resort to high isolation between the receiving antenna and the emitting antenna by greatly reducing the amplification gain of the signal, for example. A better solution consists of working with different receiving and emitting frequencies.

Advantageously, the frequency F2 is different to the frequency F1 in order to solve the self-blindness problems inherent in the repeaters of a single input frequency and amplified output frequency.

Figure 1B:
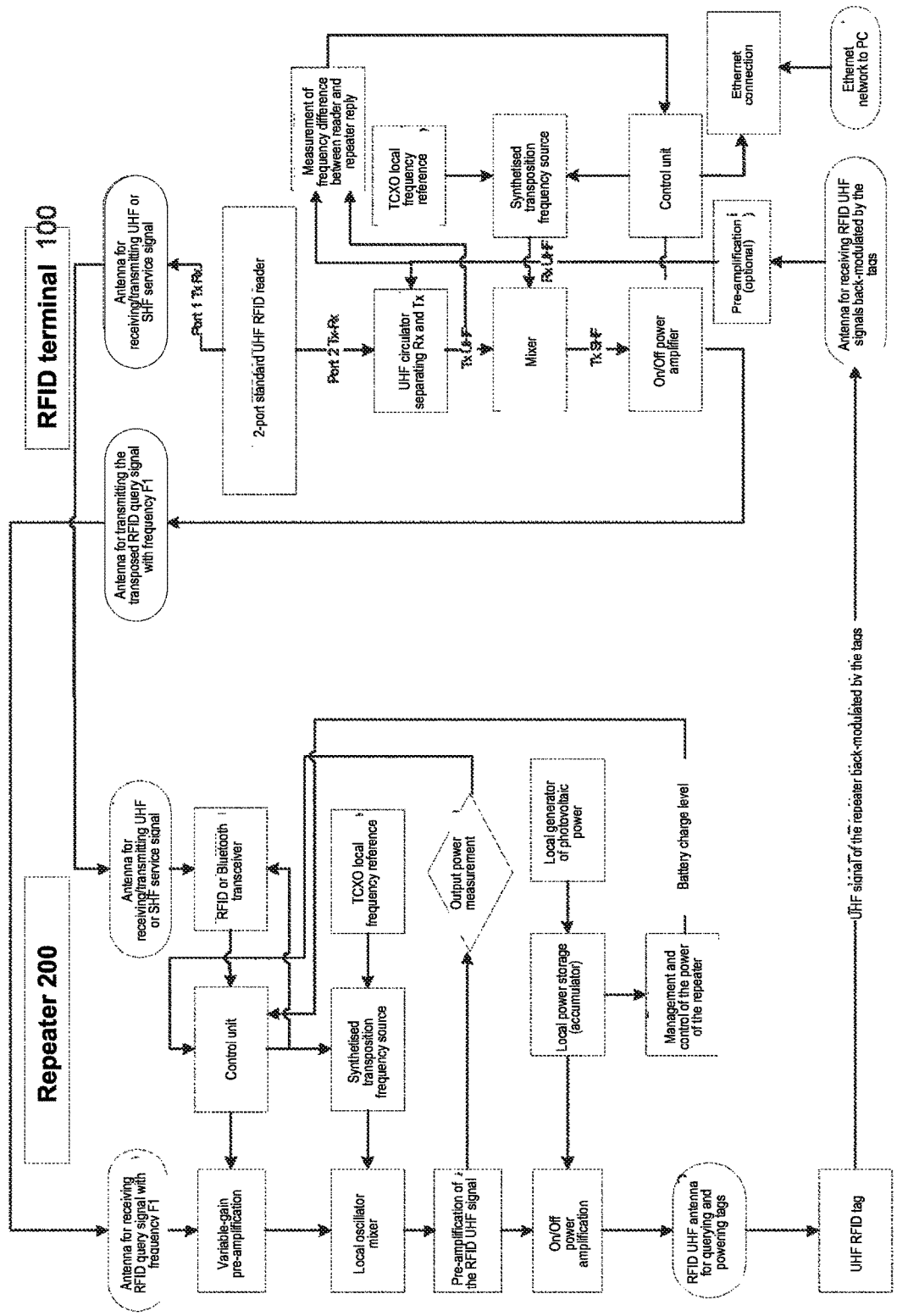
FIG. 1b shows a detailed diagram of the interactions between the elements of a system of the invention, according to one embodiment wherein the reader is a monostatic reader.

FIGS. 1a and 1b show the interactions that take place between the various elements of the present invention. The invention relates to an RFID terminal 100 comprising a commercially available standard RFID reader 110 and an add-on RFID device 120. The RFID terminal 100 is connected to a computer network via a wired and/or wireless system. For example, the RFID terminal 100 can be connected to a computer by an Ethernet cable. The add-on RFID device 120 is an additional module for generating signals at a frequency F1 from signals with frequency F0, preferably amplitude modulated and advantageously according to RFID UHF standards ISO 18000-6 and EPC Gen2.

According to one embodiment, the RFID terminal 100 includes 3 antennas. The first antenna corresponds to the emission of at least one interrogation signal at a frequency F1. The frequency F1 is preferably comprised between 2.4 GHz and 2.5 GHz, and advantageously between 2.4 GHz and 2.4835 GHz, advantageously between 2.446 GHz and 2.454 GHz, and preferably is equal to 2.45 GHz. The second antenna corresponds to the reception of at least one backscattered response signal from at least one RFID transponder 300 at the frequency F3. Finally, the third antenna corresponds to the emission and the reception of control signals to and from at least one repeater 200 at a frequency F4. This service communication channel is advantageously uncoupled from the add-on RFID device 120 of the RFID terminal 100; thus, according to one embodiment and advantageously, the third antenna is directly connected to the standard RFID reader 110.

According to one embodiment, the repeater 200 includes at least three antennas. A first antenna corresponds to the reception of the interrogation signal at the frequency F1 from the RFID terminal 100. The second antenna corresponds to the repetition of the interrogation signal at the frequency F2 towards at least one RFID transponder 300. Finally, the third antenna corresponds to the service communication channel, which allows the emission and reception of signals at a frequency F4 from and towards the RFID terminal 100.

Advantageously, the frequency F4 is equal to the frequency F0.

Advantageously, the frequency F0 is equal to the frequency F2.

Advantageously, the frequency F3 is equal to the frequency F0.

According to one embodiment, the RFID transponders 300 are standard, commercially available transponders, and the frequency F2 is advantageously equal to the frequency F3.

Figure 2:
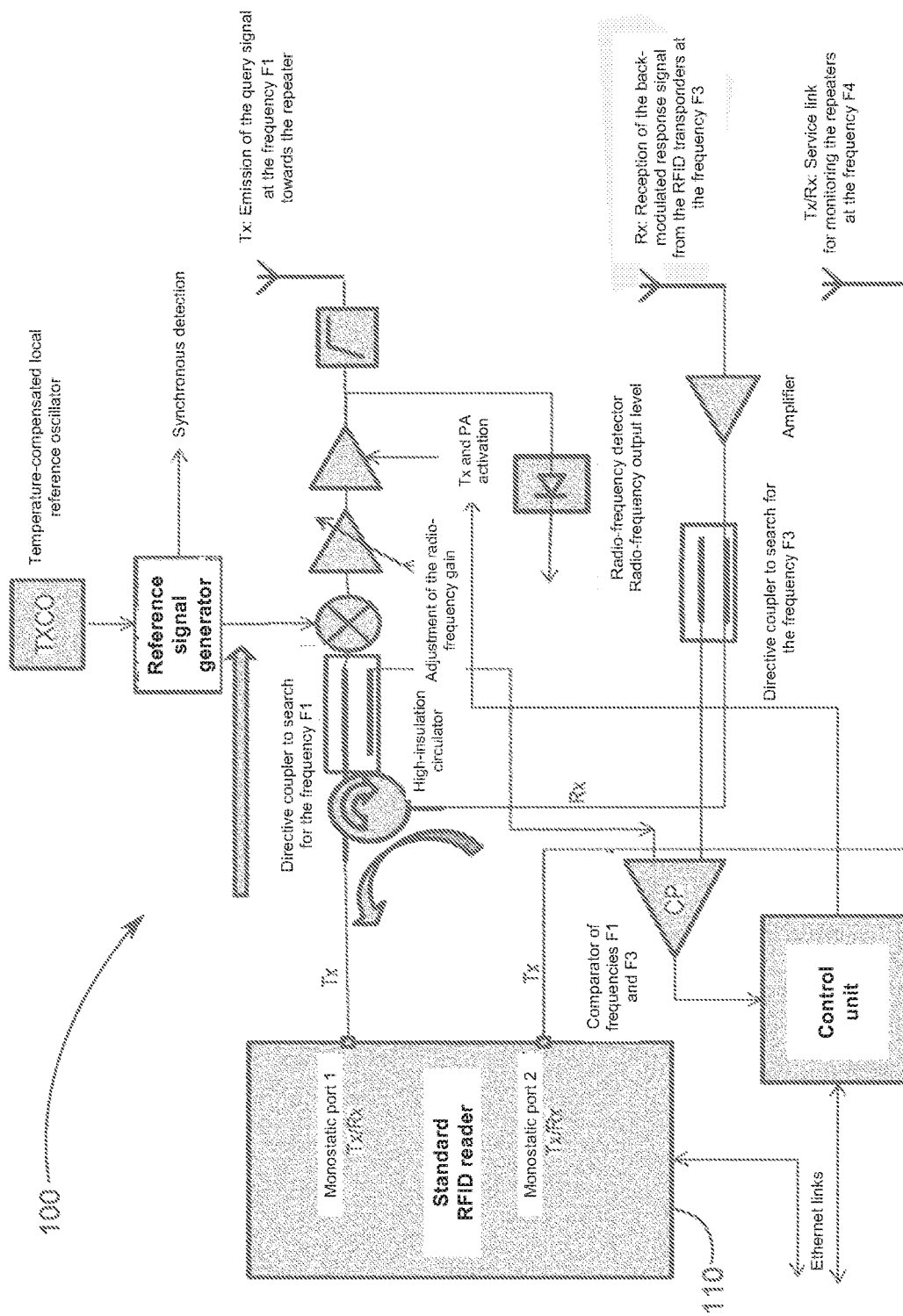
FIG. 2 shows the architecture, according to one embodiment of the present invention, of an RFID terminal with a monostatic reader.

FIG. 2 shows the architecture of an RFID terminal 100 according to one embodiment of the present invention. The RFID terminal 100 includes a commercially available standard RFID reader 110 and an add-on RFID device 120. The standard RFID reader 110 is a commercially available standard RFID reader which has at least two monostatic ports.

According to one embodiment, the first monostatic port is connected to the first and second antennas of the RFID terminal 100 passing through a high-isolation circulator in order to separate the incoming signals from the outgoing signals. According to one embodiment, the add-on RFID device 120 then performs a frequency conversion of the signals emitted and received by the RFID terminal 100.

The second monostatic port is connected directly to the third antenna of the RFID terminal 100. The second monostatic port is then used as a communication port for the service communication channel with the repeater 200.

According to one embodiment, the RFID terminal 100 includes a UHF Gen2 Standard monostatic RFID reader 110. The term monostatic indicates that a single port receives and emits signals; the emitted signals are referred to as Tx and the received signals as Rx.

According to one embodiment, the RFID terminal 100 includes a circulator which makes it possible to isolate the response signal backscattered by the RFID transponders 300.

According to one embodiment, the RFID terminal 100 includes a generator of reference signals comprising or made up of a reference local oscillator, preferably temperature-compensated. Advantageously, the frequency of said reference local oscillator is identical to the frequency of the reference local oscillator included in the repeater 200.

According to one embodiment, the RFID terminal 100 includes a generator of reference signals at the frequency of 1.55 GHz which, mixed with the interrogation signal at a frequency close to 900 MHz, produces an interrogation signal transposed to 2.45 GHz.

According to one embodiment, the RFID terminal 100 includes a power amplifier supplying an antenna at 2.45 GHz and capable of communicating at a plurality of tens of meters from the repeaters 300.

According to one embodiment, the RFID terminal 100 includes an antenna 2.45 GHz suitable for transmitting the interrogation signal towards the repeaters 200.

According to one embodiment, the RFID terminal 100 includes a system for measuring the frequency offset between the signal emitted by the standard RFID reader 110 and the signal backscattered by the RFID transponders 300 from the repeaters 200.

According to one embodiment, the RFID terminal 100 includes a service communication channel allowing the RFID terminal 100 to communicate with the repeaters 200 via an antenna adapted to the service frequency.

According to one embodiment, the RFID terminal includes a control unit managing the RFID terminal 100 and sending the control data towards the repeaters 200 via the service communication channel.

According to one embodiment, when an interrogation signal with frequency F0 is emitted by the monostatic standard RFID reader 110, it transits via a high-isolation circulator in order to separate the received signals from the emitted signals. Then, the interrogation signal with frequency F0 passes through a directional coupler to seek the frequency F1 before being mixed in the analog mixer with the reference signal with frequency F1−F0 and/or F1+F0. At the output of said mixer, the interrogation signal has, as its frequency, the frequency F1. Then, this interrogation signal with frequency F1 is amplified and the emitted by the RFID terminal 100 towards at least one repeater 200.

According to one embodiment, when a backscattered response signal with frequency F3 is received by the RFID terminal 100, it is first amplified and then transits via a directional coupler to seek the frequency F3 before passing through a high-isolation circulator so as to be separated from the interrogation signals emitted by the standard RFID reader 110.

According to one embodiment, in the case of a standard bistatic RFID reader 110, the communication port for emitting interrogation signals and the communication port for receiving backscattered response signals are separate from one another and thus make it possible not to resort to a high-isolation circulator.

According to one embodiment, when an interrogation signal with frequency F0 is emitted by the standard bistatic RFID reader 110, it passes through a directional coupler to seek the frequency F1 before being mixed in an analog mixer with the reference signal with frequency F1−F0 and/or F1+F0. At the output of said mixer, the interrogation signal has, as its frequency, the frequency F1. Then, this interrogation signal with frequency F1 is amplified and the emitted by the RFID terminal 100 towards at least one repeater 200.

According to one embodiment, when a backscattered response signal with frequency F3 is received by the RFID terminal 100, it is first amplified and then transits via a directional coupler to seek the frequency F3.

Figure 3:
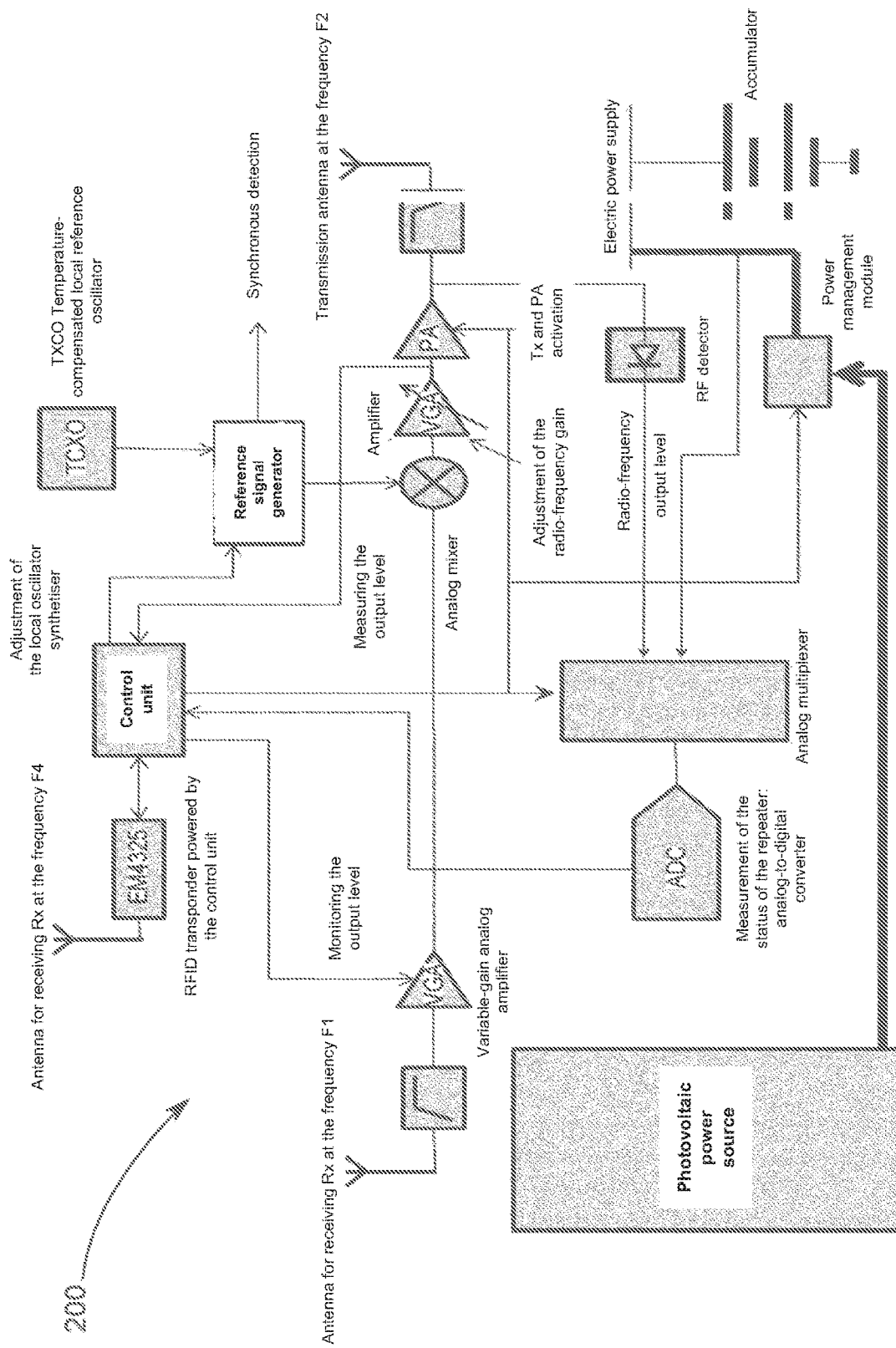
FIG. 3 shows the architecture, according to one embodiment of the present invention, of a repeater.

FIG. 3 shows the architecture of a repeater 200 according to one embodiment of the present invention. A repeater 200 includes at least one antenna for receiving the interrogation signal with frequency F1. This antenna transmits the received signal to an analog mixer in order to carry out the frequency transposition to the frequency F2. The analog mixer is connected to the generator of reference signals comprising the reference local oscillator in order to perform the analog frequency transposition. Said reference signal is stabilised at the frequency F1−F2 and/or F1+F2 by using the temperature-compensated reference local oscillator. A control unit controls the generator of reference signals. This control unit is also connected to an RFID transponder, of type EM4325 for example; said RFID transponder is referred to as add-on RFID transponder associated with the repeater 200.

According to one embodiment, the repeater 200 includes at least one electric power source; said power source is advantageously a rechargeable battery.

According to one embodiment, when an interrogation signal emitted by the RFID terminal 100 is received by the repeater 200, it passes first through an analog gain amplifier before being mixed in an analog mixer with the reference signal with frequency F1−F2 and/or F1+F2. Then, the interrogation signal with frequency F2 is amplified before being emitted towards at least one RFID transponder 300.

Figure 4:
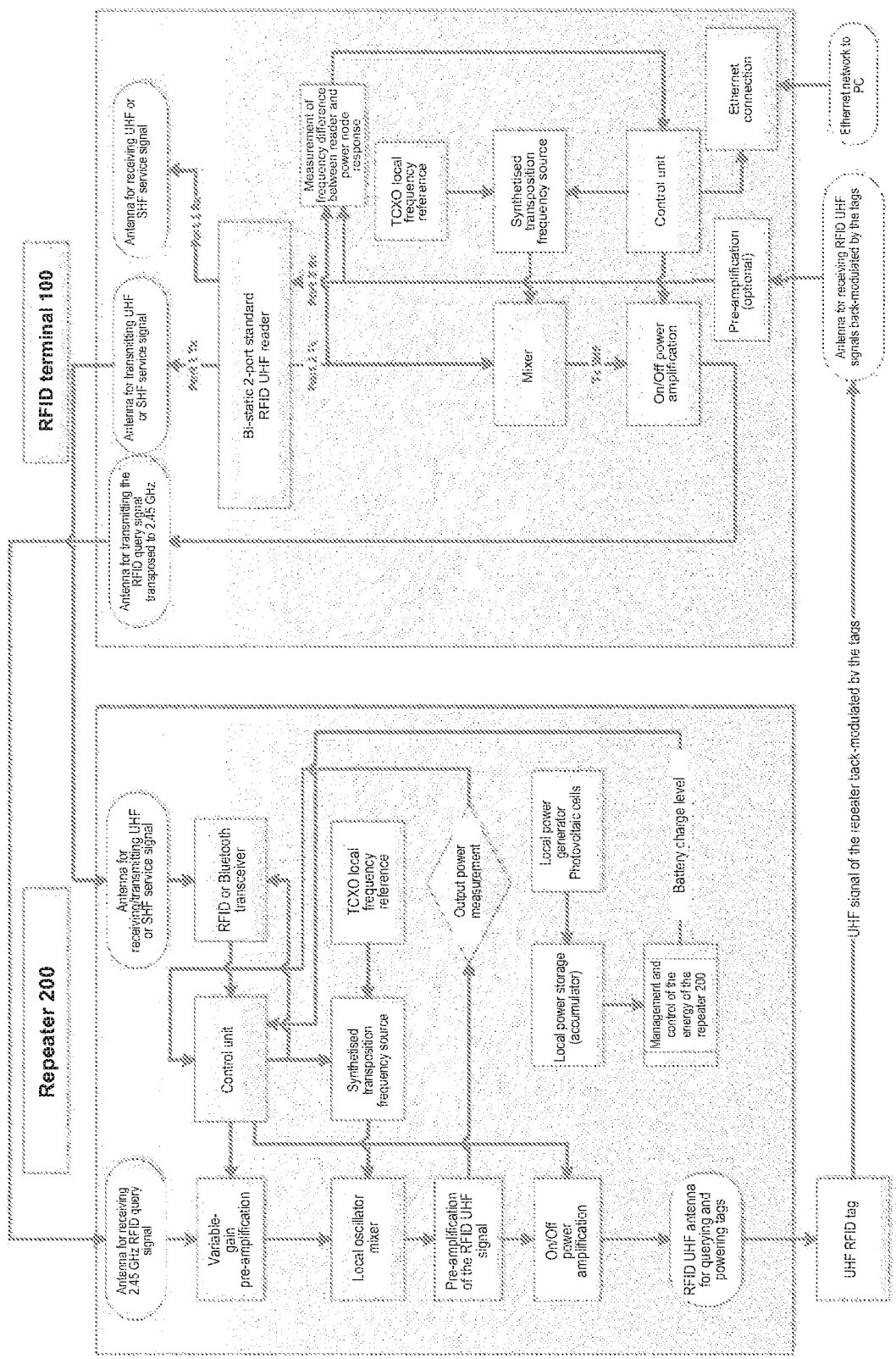
FIG. 4 shows a detailed diagram of the interactions between the elements of a system of the invention, according to one embodiment wherein the reader is a bistatic reader.

FIG. 4 shows a detailed diagram of the interactions between elements of a system of the invention, according to one embodiment wherein the standard RFID reader 110 is a standard bistatic RFID reader, and the architecture of an RFID terminal 100 with a standard bistatic RFID reader 110.

Figure 5:
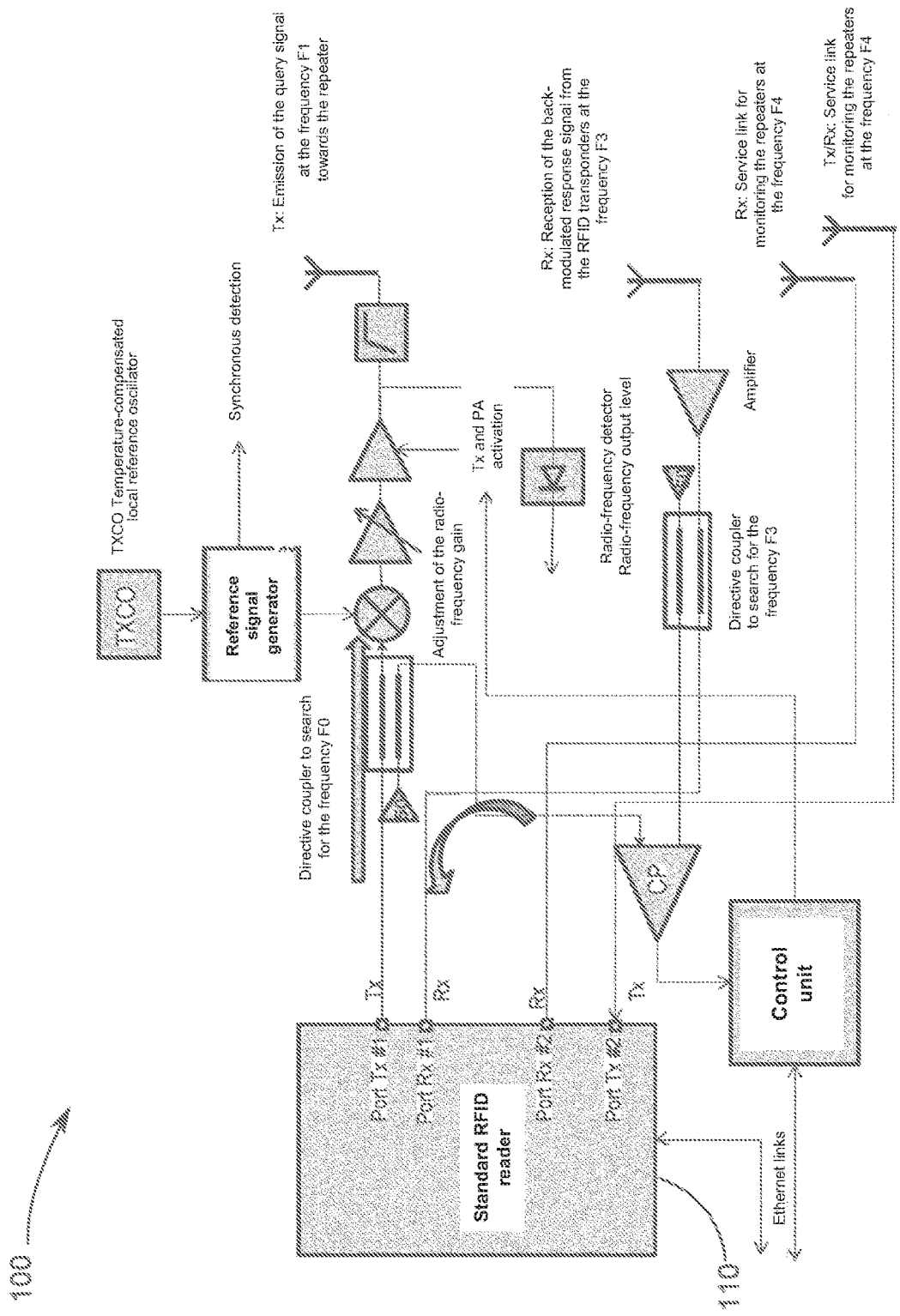
FIG. 5 shows the architecture, according to one embodiment of the present invention, of an RFID terminal with a bistatic reader.

FIG. 5 shows the architecture of an RFID terminal 100 with a standard bistatic RFID reader 110.

For the description of the various components and individual steps of said FIGS. 4 and 5, reference can be made to the descriptions relative to FIGS. 1b and 2, which use monostatic RFID readers 110.

The use of a standard bistatic RFID reader 110 has several advantages. In particular, it does away with the need to have a directional coupler on the side of the RFID terminal 100 in order to isolate the emitted signal Tx from the received signal Rx. These signals are carried to the standard bistatic RFID reader 110 via two separate communication ports and thus are much better isolated. Typically, a double circulator makes it possible to obtain 50 dB (decibels) of isolation.

Furthermore, this embodiment makes it possible to improve the sensitivity of the standard RFID reader 110. Typically, −100 dBm (dBm: power ratio in decibels (dB) between the measured power and one milliwatt (mW)) is obtained for a standard bistatic RFID reader, compared with −80 dBm for a standard monostatic RFID reader. With this 20 dB gain, a reading range of the RFID transponders 300 by the RFID terminal 100 is obtained which is ten times higher in theory, passing from several tens of meters to several hundred meters with the same input power of the RFID transponders 300. The limiting factor is thus the link between the RFID terminal 100 and the repeaters 200 at the advantageous frequency of 2.45 GHz.

According to one embodiment, the control unit and the add-on RFID transponder associated with the repeater 200 exchange data. The control unit sends, for example to the add-on RFID transponder, associated with the repeater 200, data relating to the state of the repeater 200, for example the battery level thereof, the operating state thereof (operating or stopped) and/or all other useful information to ensure the best management of the network of repeaters 200. The add-on RFID transponder associated with the repeater 200 is connected to the third antenna of the repeater 200. Said antenna corresponds to the service communication channel capable of receiving a control signal at a frequency F4 and of emitting a backscattered response signal at a frequency F4. The information exchanged by said service communication channel can be used, for example, to adjust the frequency F2 relative to the frequency F0.

Advantageously, the add-on RFID transponder associated with the repeater 200 is an active RFID transponder powered by the battery of the repeater 200.

According to one embodiment, the power source of the repeater 200 comes from an accumulator which is charged from photovoltaic cells, for example. Therefore, the repeater 200 is independent from any electrical connection and has low maintenance requirements.

According to one embodiment, the repeater 200 has a battery and/or a wired power supply.

According to one embodiment, the repeaters 200 do not have a unit for processing complex data. Only the recovery of surveillance data and basic commands requires a basic local automaton.

According to one embodiment, the RFID terminal 100 can communicate with the repeater 200 via the service communication channel through the add-on RFID transponder associated with the repeater 200. The RFID terminal 100 can thus collect data relating for example to the state of charge of the repeater 200, the amplification gain, the measurement of the receiving and/or emitting signals and/or the measurement of the local reference frequency.

According to one embodiment, the remote control of the repeaters 200 can be carried out either by using an RFID transponder to send and receive information from the repeaters 200 or by using one of the free ports of the standard RFID reader 110. For example, the memory of the BAP transponder (EM4325) which can be accessed via RFID or by a wired digital serial link allows the exchange in both directions between the RFID terminal 100 and the repeater 200. A small Bluetooth Low Energy module operating at 2.45 GHz can also perform the same function.

The service communication channel is advantageously never active when the repeater 200 receives and/or emits one or more signals from and/or towards the RFID terminal 100 and/or one or more RFID transponders 300. Thus, the service communication channel operating at the frequency F4 is never active when signals with frequencies F0, F1, F2 and F3 are being transmitted and/or received. Therefore, no interference is possible.

According to one embodiment, the repeaters 200 include an antenna for receiving at 2.45 GHz the interrogation signal sent by the RFID terminal 100.

According to one embodiment, the repeaters 200 include a control unit managing the control data received from the RFID terminal 100 via the service communication channel in RFID ISM band at a frequency close to 900 MHz or in Bluetooth Low Energy.

According to one embodiment, the repeaters 200 include a variable-gain preamplifier controlled by the control unit.

According to one embodiment, the repeaters 200 include a temperature-compensated frequency reference.

According to one embodiment, the repeaters 200 include a generator of reference signals at the frequency of 1.55 GHz, for example, from the reference frequency adjusted by the control unit in order to be closest to the frequency F0 of the RFID terminal 100.

According to one embodiment, the repeaters 200 include a mixer for analog transposition to the ISM band, at a frequency close to 900 MHz, of the signal received from the RFID terminal at 2.45 GHz by mixing with a reference local oscillator at 1.55 GHz, for example.

According to one embodiment, the repeaters 200 include a power amplifier which powers an antenna with a frequency near 900 MHz, which makes it possible to interrogate the RFID transponders 300 with a maximum authorised radiated power, controlled by the control unit.

According to one embodiment, the repeaters 200 include a receiving antenna adapted to the receiving band of the service signal with a frequency near 900 MHz and/or 2.45 GHz.

According to one embodiment, the repeaters 200 include a self-contained power supply such as a battery or a storage battery, which can be recharged by one or more environmental energy sources, for example light energy.

According to one embodiment, the present invention includes repeaters 200 that do not have a processor and are capable of repeating the interrogation signals from an RFID terminal 100 without demodulating the interrogation signals.

According to one embodiment, there is a latency of less than 1 microsecond according to the system of the present invention: the insertion of a repeater 200 into the transmission of an interrogation signal towards the RFID transponder 300 is transparent from the point of view of the UHF Gen2 protocol viewed by the RFID terminal 100, which can then include a single commercially available standard RFID reader 110 with an add-on RFID device 120 to emit the interrogation signals at a frequency F1, said frequency is preferably equal to 2.45 GHz, from a signal with frequency F0, said frequency is preferably advantageously near 900 MHz, and preferably equal to 866 MHz in Europe, amplitude modulated according to RFID UHF standards ISO 18000-6 and EPC Gen2.

According to one embodiment, the system architecture proposed by the present invention makes it possible to update an existing RFID installation by simply adding an add-on RFID device 120, which only contains what is necessary for transposing and amplifying the signal, which is monostatic for example, from an existing standard RFID reader 110. The infrastructure cost is thus reduced to a central additional module and to repeaters that are not powered by the mains, since they do not require powerful processing of on-board data.

According to one embodiment, the proposed architecture, in which the repeaters 200 are linked entirely without communication and power wires, allows straightforward installation with no modification of the premises to be monitored. Only the one or more RFID terminals 100 which centralise the readings need to be connected to a computer network via Wi-Fi and/or Ethernet and to have an electric power source such as a mains connection, for example. The repeaters 200, on the other hand, can operate using batteries recharged by photovoltaic cells which are sensitive to the artificial light in the installation location, for example.

According to one embodiment, the arrangement of the repeaters 200 can be changed regularly at the expense of changes in the layout of the products in a ready-made garment shop, for example. The lack of cables allows non-qualified personnel to move the repeaters 200 by several meters without having to reconfigure the installation.

According to one embodiment, the interrogation frequency F0 is transposed to a different unlicensed authorised frequency, for example such as the ISM 2.45 GHz band by the add-on RFID device 120 of the RFID terminal 100. This interrogation signal is transmitted to repeaters 200 distributed in the space to be inventoried. Thus, the interferences at the frequency F0 which are typical of standard RFID readers 110, or at a frequency near 900 MHz, for example, are reduced. Thus, the low levels backscattered by the RFID transponders 300 arrive at the UHF antenna of the RFID terminal 100 with a low noise level. In addition, the power of the signal at the output of the UHF RFID reader 110 does not need to be high, since it no longer remotely powers the RFID transponders 300 directly and is between 0 dBm and 30 dBm, advantageously between 10 dBm and 20 dBm and preferably between 10 and 18 dBm. These power levels make it possible to operate the receiver of the standard RFID reader 110 under the best possible conditions by minimising the parasitic level of the emission signal which is injected back into the receiver and which reduces the dynamics and thus the sensitivity of the receiver.

According to one embodiment, the present invention relates to a synchronous or quasi-synchronous system between the emission of an interrogation signal and the reception of a backscattered response signal. This synchronicity or quasi-synchronicity is necessary in order to maintain the initial performance of the standard RFID reader 110.

According to one embodiment, the difference between the frequencies is less than 500 Hz between the frequency F2 of the repeaters 200 and the frequency F0 of the standard RFID reader 110 of the RFID terminal 100 in the case that the frequency F3 is equal to the frequency F2. For a frequency difference higher than 500 Hz reading performance reductions can be perceived. Once the frequencies of the repeaters 200 are set, they remain stable over a period of several days, in particular by the implementation of temperature-compensated local reference oscillators, which ensure stabilities of several ppm.

According to one embodiment, the interrogation signal repeated by the repeater 200 with frequency F2 consists of an amplitude modulation of an electromagnetic carrier wave with frequency F2. This repeated interrogation signal with frequency F2 then acts as an energising wave, in addition to transmitting information to the RFID transponders 300. Said remote supply is configured to supply enough energy to the RFID transponders 300 for them to be able to emit a backscattered signal towards the RFID terminal 100.

According to one embodiment, the repeater 200 includes a housing and the add-on RFID transponder is rigidly connected to said housing.

According to one embodiment, the repeater 200 is rigidly connected to the add-on RFID transponder which is associated with same.

According to one embodiment, the repeater 200 and the add-on RFID transponder which is associated with same are connected together in a wired and/or wireless manner.

According to one specific embodiment, the repeater 200 can include a plurality of channels for repeating the interrogation signal, configured to transmit interrogation signals repeated at the same frequency and/or at different frequencies.

According to a particularly advantageous embodiment, the repeater 200 can include a plurality of channels for repeating the interrogation signal, configured to transmit the repeated interrogation signals at the same advantageous frequency F2.

According to said embodiment, each of these channels, of which there are N, for example, includes a separate antenna. Each antenna is configured to emit a repeated interrogation signal at the frequency F2 towards the RFID transponders 300.

According to one advantageous embodiment, the N antennas are spatially separated from one another. This makes it possible advantageously to cover a larger surface for repeating repeated interrogation signals with frequency F2.

According to this embodiment, the RFID terminal 100 can select a repetition channel, in particular in order to repeat the interrogation signal using the service communication channel with frequency F4. Thus, the RFID terminal 100 can decide which of the N antennas emits the repeated interrogation signal at the frequency F2.

This embodiment is particularly advantageous since it makes it possible considerably to extend the spatial coverage of a single repeater 200. By simply deploying the N antennas in one space, a single repeater 200 is capable of covering a surface which would require N repeaters 200 comprising a single antenna.

This embodiment is therefore particularly advantageous in economic terms.

However, according to this embodiment, the radiation of each antenna can be controlled from the RFID terminal 100 so as to be able to locate, in two dimensions and/or three-dimensions, an RFID transponder 300 arranged in the space covered by the repeater 200 and the antennas thereof.

For example, the position of the RFID transponder 300 can be deduced by measuring the response time between the emission of the interrogation signal and the reception of the response signal backscattered by said RFID transponder 300, according to at least two and/or three different antennas so as to be able to triangulate the position of the RFID transponder 300.

According to one embodiment, it is also possible to locate an RFID transponder 300 using a plurality of repeaters 200 distributed according to the space in which said RFID transponder 300 is arranged.

The use of the add-on RFID device 120 makes it possible, by simply adding said module to a standard RFID reader 110, for the latter to communicate at various frequencies according to the configuration of the add-on RFID device 120. Thus, it is advantageously possible to integrate a solution based on a network of power nodes, or repeaters, in a pre-existing RFID environment by simply adding said add-on RFID device 120 to the standard RFID readers 110 already in place in order to allow communication according to various frequencies.

The add-on RFID device 120 is connected to the standard RFID reader 110 in a wired and/or wireless manner. This ensures a frequency transposition of all signals emitted by the standard RFID reader 110 according to the configuration thereof.

Likewise, if need be, the add-on RFID device 120 transposes all the received signals according to the configuration thereof before retransmission to the standard RFID reader 110.

According to one specific embodiment, the add-on RFID device 120 is configured to transpose, in an optionally analog manner, a backscattered response signal with frequency F3, emitted by an RFID transponder 300 for example, into a backscattered response signal with frequency F0 intended for the standard RFID reader 110 contained with the add-on RFID device 120 in the RFID terminal 100.

The add-on RFID device 120 can be applied to any type of standard RFID reader 110, whether monostatic or bistatic. The installation thereof on a standard RFID reader 110 is carried out, for example, by a single wired connection at the communication ports of the standard RFID reader 110.

According to one embodiment, the add-on RFID device 120 is configured to perform an exclusively analog frequency transposition.

According to one embodiment, the add-on RFID device 120 is configured to perform a frequency transposition of a signal with frequency F0 into a signal with frequency F1, regardless of the type of modulation of the signal with frequency F0.

The invention is not limited to the embodiments described above and extends to all the embodiments covered by the claims.

The invention claimed is:

1. A system for electromagnetic interrogation of RFID transponders, comprising:
at least one RFID terminal configured to emit an interrogation signal at a frequency F1;
at least one repeater, constituted by an RFID device configured to receive the interrogation signal with the frequency F1 and to repeat same at a frequency F2 towards at least one RFID transponder configured to emit a backscattered response signal at a frequency F3 in response to the repeated interrogation signal with the frequency F2,
wherein the at least one RFID terminal includes
at least one RFID reader configured to emit an interrogation signal with a frequency F0, and
at least one add-on RFID device configured to perform a frequency transposition from the frequency F0 to the frequency F1, in order to transpose said interrogation signal with the frequency F0, emitted by the at least one RFID reader, into the interrogation signal with the frequency F1, the frequencies F0 and F1 being different from each other, and the interrogation signal with the frequency F1 configured to be received by the at least one repeater,
and wherein in order to repeat, at the frequency F2, said interrogation signal with the frequency F1, the at least one repeater is configured to perform an exclusively analog frequency transposition from the frequency F1 to the frequency F2,
the at least one repeater comprising a generator of reference signals, and
the exclusively analog frequency transposition includes mixing said interrogation signal with the frequency F1 with a reference signal generated by said generator of reference signals at a frequency F1−F2 and/or F1+F2 to provide said repeated interrogation signal with the frequency F2.

2. The system according to claim 1, wherein the add-on RFID device is configured so that said frequency transposition from the frequency F0 to the frequency F1 is carried out in an exclusively analog manner.

3. The system according to claim 2,
wherein the at least one add-on RFID device includes a generator of reference signals, and
wherein the exclusively analog frequency transposition includes mixing said interrogation signal with the frequency F0 with a reference signal generated by said generator of reference signals at a frequency F1−F0 and/or F1+F0 so as to supply said interrogation signal with the frequency F1.

4. The system according to claim 3, wherein the generator of reference signals of the at least one add-on RFID device includes a local reference oscillator in which the frequency is equal to F1−F0 and/or F1+F0.

5. The system according to claim 1, wherein the at least one add-on RFID device is configured to perform only:
a transposition of the interrogation signal from the frequency F0 to the frequency F1,
an amplification of the interrogation signal with the frequency F1, and
an amplification of the backscattered response signal with the frequency F3.

6. The system according to claim 1, wherein the at least one add-on RFID device includes:
a generator of reference signals at the frequency F1−F0 and/or F1+F0 which, mixed with the interrogation signal at the frequency F0, produces the interrogation signal with the frequency F1;
an analog mixer of the interrogation signal with the frequency F0 and the reference signal with the frequency F1−F0 and/or F1+F0;
an antenna configured to transmit the interrogation signal with the frequency F1 towards the at least one repeater;
an amplifier of the response signal with the frequency F3; and
a system for measuring the frequency offset between the interrogation signal emitted by the at least one RFID reader with the frequency F0 and the response signal backscattered by the at least one RFID transponder with the frequency F3.

7. The system according to claim 1, wherein the add-on RFID device is configured to perform a frequency transposition from the frequency F3 to the frequency F0, the frequencies F3 and F0 being different.

8. The system according to claim 7, wherein the add-on RFID device is configured so that said frequency transposition from the frequency F3 to the frequency F0 is carried out in an exclusively analog manner.

9. The system according to claim 8,
wherein the at least one add-on device includes a generator of reference signals, and
wherein the exclusively analog frequency transposition includes mixing said backscattered response signal with the frequency F3 with a reference signal generated by said generator of reference signals at a frequency F3−F0 and/or F3+F0.

10. The system according to claim 1, wherein the at least one repeater includes:
a receiving antenna configured to receive said interrogation signal with the frequency F1 emitted by the at least one RFID terminal;
at least one emitting antenna configured to emit the repeated interrogation signal with the frequency F2 towards the at least one RFID transponder;
said generator of reference signals at the frequency F1−F2 and/or F1+F2; and
an analog mixer of said received interrogation signal with the frequency F1 and said reference signal with the frequency F1−F2 and/or F1+F2, configured to output a repeated interrogation signal with the frequency F2.

11. The system according to claim 1,
wherein said RFID reader is a monostatic UHF Gen2 RFID reader, and
wherein the at least one RFID terminal includes:
a circulator configured to isolate the response signal backscattered by the at least one RFID transponder;
a generator of reference signals at the frequency F1−F0 and/or F1+F0 which, mixed with interrogation signal at the frequency F0, produces an interrogation signal with the frequency F1;
an analog mixer of the interrogation signal with the frequency F0 and the reference signal with the frequency F1−F0 and/or F1+F0;
an antenna configured to transmit the interrogation signal with the frequency F1 towards the at least one repeater;
an antenna configured to receive the response signal with the frequency F3 coming from the at least one RFID transponder; and
a system for measuring the frequency offset between the interrogation signal emitted by the at least one RFID reader (110) with the frequency F0 and the response signal backscattered by the at least one RFID transponder (300) with the frequency F3.

12. The system according to claim 11, wherein the at least one RFID reader comprises at least one common communication port for receiving backscattered response signals emitted by the at least one RFID transponder and for emitting interrogation signals with the frequency F0 with which the at least one add-on RFID device is connected.

13. The system according to claim 11, wherein the RFID terminal is configured so that the interrogation signal with the frequency F0 emitted by the RFID reader transits via a high-isolation circulator, then passes through a directional coupler to seek the frequency F1, is then mixed in an analog mixer with the reference signal with the frequency F1−F0 and/or F1+F0 so that, at the output of said mixer, said interrogation signal has, as its frequency, the frequency F1, and is then amplified and emitted by the RFID terminal towards at least one repeater.

14. The system according to claim 11, wherein the RFID terminal is configured so that the backscattered response signal with the frequency F3 received by the RFID terminal is first amplified and then transits via a directional coupler to seek the frequency F3 before passing through a high-isolation circulator so as to be separated from the interrogation signals emitted by the RFID reader.

15. The system according to claim 1,
wherein said RFID reader is a bistatic UHF Gen2 RFID reader, and
wherein the at least one RFID terminal includes:
a generator of reference signals at the frequency F1−F0 and/or F1+F0 which, mixed with the interrogation signal at the frequency F0, produces the interrogation signal with the frequency F1;
an analog mixer of the interrogation signal with the frequency F0 and the reference signal with the frequency F1−F0 and/or F1+F0;
an antenna configured to transmit the interrogation signal with the frequency F1 towards the at least one repeater;
an antenna configured to receive the response signal with the frequency F3 coming from the at least one RFID transponder; and
a system for measuring the frequency offset between the interrogation signal emitted by the at least one RFID reader with the frequency F0 and the response signal backscattered by the at least one RFID transponder with the frequency F3.

16. The system according to claim 15, wherein the RFID terminal is configured so that the interrogation signal with the frequency F0 emitted by the RFID reader passes through a directional coupler to seek the frequency F1, is then mixed in an analog mixer with the reference signal with the frequency F1−F0 and/or F1+F0 so that, at the output of said mixer, said interrogation signal has, as its frequency, the frequency F1, and is then amplified and emitted by the RFID terminal towards at least one repeater.

17. The system according to claim 15, wherein the RFID terminal is configured so that the backscattered response signal with the frequency F3 received by the RFID terminal is first amplified and then transits via a directional coupler to seek the frequency F3.

18. The system according to claim 1, wherein the at least one RFID terminal includes a system for measuring the frequency offset between the interrogation signal with the frequency F0 and the backscattered response signal with the frequency F3 by the at least one RFID transponder.

19. The system according to claim 1, wherein the frequency gap between the frequencies F0 and F2, between the frequencies F0 and F3, and between the frequencies F2 and F3 is lower than 1000 Hz.

20. The system according to claim 1, wherein the frequencies F0, F2, F3 are equal.

21. The system according to claim 1,
wherein the frequency F1 is between 2.446 GHz and 2.454 GHz,
wherein the frequency F2 is comprised between 866 MHz and 867 MHz or between 902 MHz and 928 MHz,
wherein the frequency F0 is comprised between 866 MHz and 867 MHz or between 902 MHz and 928 MHz, and
wherein the frequency F3 is comprised between 866 MHz and 867 MHz or between 902 MHz and 928 MHz.

22. The system according to claim 1, configured so that said repeated interrogation signal with the frequency F2 emitted by the at least one repeater and received by the at least one RFID transponder supplies enough energy to said RFID transponder for said RFID transponder to emit said backscattered response signal with the frequency F3.

23. An RFID terminal for a system for electromagnetic interrogation of at least one RFID transponder, the RFID terminal being configured to emit an interrogation signal at a frequency F1 to be received by at least one repeater constituted by an RFID device or by the at least one RFID transponder, wherein the RFID terminal comprising:
at least one RFID reader configured to emit an interrogation signal with a frequency F0; and at least one add-on RFID device configured to perform a frequency transposition from the frequency F0 to the frequency F1 in order to transpose said interrogation signal with the frequency F0 emitted by the at least one RFID reader into the interrogation signal with the frequency F1, the frequencies F0 and F1 being different from each other and the interrogation signal with the frequency F1 configured to be received by the at least one repeater, wherein the add-on RFID device is configured so that said frequency transposition from the frequency F0 to the frequency F1 is carried out in an exclusively analog manner, wherein the terminal includes a housing inside which the RFID reader and the add-on RFID device are housed, and wherein the RFID terminal also includes at least one antenna adapted to a service frequency F4, the RFID terminal configured to communicate at the service frequency F4 with the at least one repeater via the at least one antenna adapted to the service frequency F4, the service frequency F4 being different from the frequency F1.

24. The RFID terminal according to claim 23, wherein the add-on RFID device is connected in a wired manner to the at least one RFID reader.

25. An add-on RFID device for a system for electromagnetic interrogation of RFID transponders configured to emit a backscattered response signal with a frequency F3, the add-on RFID device comprises:
an RFID configured to
receive an interrogation signal at the frequency F0 emitted an RFID reader, and
transpose said interrogation signal with the frequency F0 to an interrogation signal with a frequency F1 different from the frequency F0, said interrogation signal with the frequency F1 configured to be received by at least one signal repeater or at least one transponder,
wherein in order to transpose said interrogation signal with the frequency F0 to the frequency F1, the add-on RFID device (120) is configured to perform an exclusively analog frequency transposition from the frequency F0 to the frequency F1, wherein the add-on RFID device (120) also comprises a generator of reference signals, and the exclusively analog frequency transposition comprises mixing said interrogation signal with the frequency F0 with a reference signal generated by said generator of reference signals at a frequency F1−F0 and/or F1+F0, and wherein the add-on RFID device is housed, with the RFID reader, in a RFID terminal.

26. The add-on RFID device according to claim 25, wherein said add-on RFID device includes:
a generator of reference signals at the frequency F1−F0 and/or F1+F0 which, mixed with interrogation signal at the frequency F0, produces an interrogation signal with the frequency F1;
an analog mixer of the interrogation signal with the frequency F0 and the reference signal with the frequency F1−F0 and/or F1+F0;
an antenna configured to transmit the interrogation signal with the frequency F1 towards the at least one repeater;
an amplifier of the response signal with the frequency F3; and
a system for measuring the frequency offset between the interrogation signal emitted by the at least one RFID reader with the frequency F0 and the response signal backscattered by the at least one RFID transponder with the frequency F3.

27. The add-on RFID device according to claim 25, configured so that the interrogation signal with the frequency F0 emitted by the RFID reader passes through a directional coupler to seek the frequency F1, is then mixed in an analog mixer with the reference signal with the frequency F1−F0 and/or F1+F0 so that at the output of said mixer, said interrogation signal has, as its frequency, the frequency F1, and is then amplified and emitted by the RFID terminal towards at least one repeater,
wherein the backscattered response signal with the frequency F3 received by the RFID terminal transits via a directional coupler to seek the frequency F3 before passing through a high-isolation circulator so as to be separated from the interrogation signals emitted by the RFID reader.

* * * * *